United States Patent [19]
Walter et al.

[11] Patent Number: 5,439,149
[45] Date of Patent: Aug. 8, 1995

[54] STORAGE CASE FOR A MOTORCYCLE

[75] Inventors: Hubert Walter, Penzberg; Horst Von Hagen, Iserlohn, both of Germany

[73] Assignee: Bayerische Motoren Werke AG, Munich, Germany

[21] Appl. No.: 191,044

[22] Filed: Feb. 3, 1994

[30] Foreign Application Priority Data

Feb. 3, 1993 [DE] Germany .................. 43 02 949.3

[51] Int. Cl.⁶ .............................................. B62J 7/00
[52] U.S. Cl. ................................ 224/32 R; 206/335; 190/117
[58] Field of Search ................ 224/32 A, 32 R; 206/335; 190/115, 117

[56] References Cited

U.S. PATENT DOCUMENTS

| | | | |
|---|---|---|---|
| 4,407,412 | 10/1983 | Thiele et al. | 206/303 |
| 4,460,115 | 7/1984 | Jackson | 224/32 R |
| 5,027,967 | 7/1991 | Tellas | 206/316.2 |
| 5,271,540 | 12/1993 | Katz et al. | 224/32 A |
| 5,299,720 | 4/1994 | Koch, III et al. | 224/32 R |

FOREIGN PATENT DOCUMENTS

| | | | |
|---|---|---|---|
| 1102369 | 10/1955 | France | 224/32 R |
| 8315720 | 8/1983 | Germany . | |
| 4230972 | 5/1993 | Germany . | |
| 2047644 | 12/1980 | United Kingdom | 224/32 R |

Primary Examiner—David T. Fidei
Attorney, Agent, or Firm—Evenson McKeown Edwards & Lenahan

[57] ABSTRACT

A storage case for a motorcycle is described which can be fixed on a carrier strip and which comprises a basic housing, a lid pivotally connected to the basic housing, and a constructional unit. The constructional unit is fastened on the basic housing and contains carrying and operating devices for the fixing of the basic housing on the carrier strip and/or for the locking of the lid with the basic housing. Furthermore, a lock is installed into the constructional unit which provides that the device for the fixing of the basic housing on the vehicle frame and/or the device for the locking of the lid with the basic housing can be locked.

20 Claims, 1 Drawing Sheet

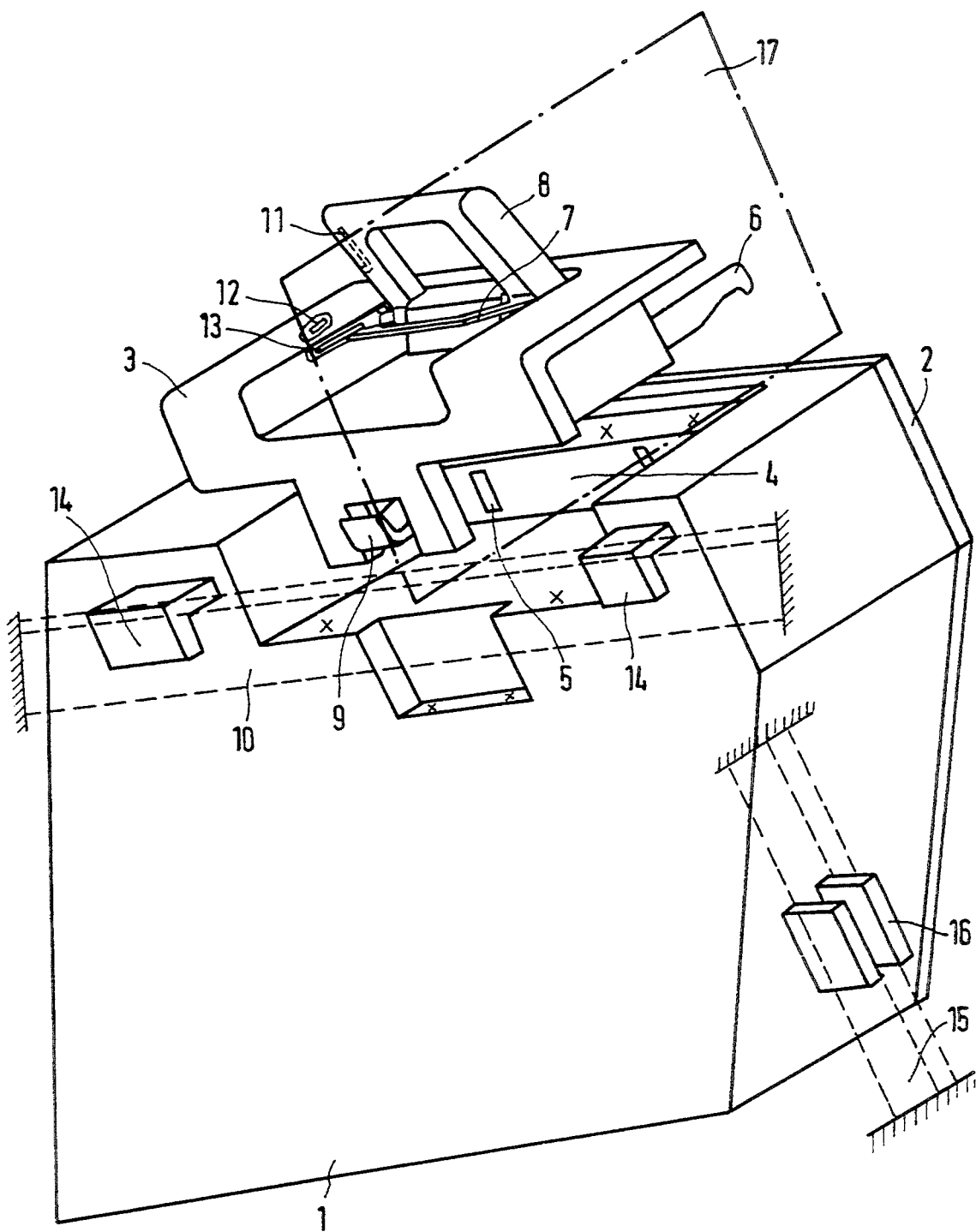

STORAGE CASE FOR A MOTORCYCLE

BACKGROUND AND SUMMARY OF THE INVENTION

This invention relates to a storage case for a motorcycle which can be fixed on the motorcycle frame and includes a basic housing, a carrying handle, a lid hinged to the housing and a device for fixing the case on the motorcycle frame and/or a device for locking the lid with the basic housing.

Known motorcycle storage cases comprise a basic housing, a lid hinged to it, a carrying handle and operating devices which make it possible to fix the basic housing on the vehicle frame and to lock the lid with the basic housing. It is also known to construct the connection of the basic housing with the vehicle frame as well as the latching of the lid so that they can be locked.

In the case of a known motorcycle storage case, the individual carrying and operating devices are mounted on the respective point of the basic housing so that they appropriately carry out their functions.

This has the disadvantage that the basic housing has a large number of molded-on areas for the fastening of the carrying and operating devices. Furthermore, the assembly of the storage case from its piece parts is time-consuming and difficult.

It is an object of the invention to develop a motorcycle storage case of the above-mentioned type in such a manner that the basic housing, the lid, the carrying and the operating devices can be mounted in a simple and rapid manner and with a precise fit. In addition, the molded-on areas for the fastening of carrying and operating devices should be within generous tolerance ranges for the basic housing and for the lid.

According to the invention, this object is achieved by an arrangement having a constructional unit fastened to the basic housing, which constructional unit contains the carrying handle, devices for fixing the basic housing on the vehicle frame and/or for the locking of the lid with the basic housing and the lock.

The use of a constructional unit which contains the carrying and operating devices has the advantage that these may be preassembled. Identical parts may be created which can be manufactured in a less expensive manner because of the larger piece number. Thus, it is possible to equip different storage cases with the same constructional unit for operating elements or to provide different operating element constructional units in the case of the same storage case housings, which constructional units are adapted to the respective motorcycle model or to the functions desired by the customer. If a motorcycle storage case consists of a basic housing, a lid and a constructional unit for the carrying and operating elements, it is possible to manufacture different storage case variants in a fast and cost-effective manner.

According to advantageous preferred embodiments of the invention, the constructional unit for the carrying and operating elements is constructed to be symmetrical in the outer contours with respect to its transverse center plane. This design has the advantage that the same constructional unit fits into a motorcycle storage case which can be mounted on the left as well as on the right side of the motorcycle. Thus, a constructional unit for the carrying and operating elements must only be manufactured in twice the piece number, and the expenditures are eliminated with respect to differentiating between carrying and operating elements which can be installed either only on left or on right storage cases.

The fastening of the constructional unit on the basic housing by means of rivets according to certain preferred embodiments is advantageous for a simple and fast mounting of the motorcycle storage case.

In the case of an advantageous construction of the invention, the basic housing is suspended by means of two angular suspension hooks on a carrier strip and is fixed on the carrier strip by means of a holding angle which is swivellably held in the constructional unit. This has the advantage that the fastening of the motorcycle storage case on the vehicle frame is taken over in a simple manner by the constructional unit.

In the case of a preferred embodiment of the invention, the holding angle is situated between the two securing hooks on the bottom of the basic housing. This has the advantage that the constructional unit can be placed by means of the carrying handle in a favorable manner with respect to the point of gravity of the storage case.

An advantageous stable fastening on the vehicle frame is obtained when a profile exists on the face of the basic housing which positions the motorcycle storage case on a section that is fixed to the vehicle.

An advantageous simple and cost-effective construction is achieved when the carrier strip forms the section fixed to the vehicle which is surrounded by the profile.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a perspective exploded view of a motorcycle storage case constructed according to a preferred embodiment of the invention.

DETAILED DESCRIPTION OF THE PREFERRED EMBODIMENTS

The single FIGURE is a perspective exploded view of a motorcycle storage case having a basic housing, which is fastened to the vehicle frame indicated by an interrupted line, and of a constructional unit for carrying and operating devices which is shown spaced away from the basic housing.

Accordingly, the motorcycle storage case comprises a basic housing 1 and a lid 2 which is hinged to it by means of hinges which are not shown. A constructional unit 3 fits exactly into a recess 4 in the basic housing 1 which corresponds to its shape and is fastened in this recess 4 by means of rivets (illustrated by crosses "x" in the drawing). For the purpose of clarity, the construction unit 3 is shown in the drawing to be spaced out of the recess 4 in the upward direction. In the recess 4, two openings 5 are situated through which one locking strip 6 respectively projects for the fastening of the lid 2 on the basic housing 1. The locking strips 6 are operated by the swivelling of the locking handle 7 by 90 degrees. When the locking handle 7 rests against the constructional unit 3, the lid 2 will be locked; when the locking handle 7 is swivelled back by 90 degrees, the lid 2 is unlocked. The locking strip 6 and the locking handle 7 are housed in the constructional unit 3 next to the other carrying and operating devices for the motorcycle storage case.

The carrying handle 8 is disposed in the construction unit 3 so that it can be swivelled coaxially to the locking handle 7. The carrying handle swivel axis 8 is congruent with the swivel axis of locking handle 7 and, like this locking handle 7, can also be swivelled by 90 degrees. Carrying handle 8 controls a holding angle 9 which fixes the motorcycle storage case on a carrying strip 10. In the basic position of the carrying handle 8, when it rests against the constructional unit 3, the holding angle 9 is placed around the carrier strip 10 and, as a result, the motorcycle storage case is fixed to the vehicle frame. By the swivelling-up of the carrying handle 8 by 90 degrees into its carrying position, the fixing of the motorcycle storage case on the vehicle frame is released in that the holding angle 9 swivels back downward into the constructional unit 3. The locking handle 7 and the carrying handle 8 are operatively coupled together; the storage case can therefore be carried only by means of the carrying handle 8 or simultaneously by means of the carrying handle 8 and the locking handle 7. In the former case, the lid is locked; in the latter, it is unlocked.

By means of a groove 11 in the side of the carrying handle 8, the carrying handle 8 and the locking handle 7 together can be secured in their basic position with respect to swivelling by means of a lock 12. When the carrying handle 8 is in the carrying position, it is possible to secure only the locking handle 7. The lock 12 and the pertaining locking bolt 13, which engages in the groove 11 in the carrying handle 8 as a result of the operating of the lock 12, are housed in the constructional unit 3. In the locked position of the lock 12, the lid 2 is fixed on the basic housing 1 by means of the locking strips 6, and the holding angle 9 is in the position which fixes the motorcycle storage case on the carrier strip 10.

In order to be able to fasten the motorcycle storage case on the motorcycle frame and therefore on the carrier strip 10, the carrying handle 8 must be brought into the carrying position. By means of suspension hooks 14, which are situated on the bottom of the basic housing 1, the motorcycle storage case will then be suspended on the carrier strip 10. By means of the shifting of the motorcycle storage case on the carrier strip 10 in the direction of the second leg 15 of the carrier strip 10, a profile 16, which is situated on a face of the basic housing 1, is pushed over the second leg 15 of the carrier strip 10. This connection is used for the additional positioning of the motorcycle storage case. Then, the carrying handle 8 is swivelled into its basic position, which has the result that the holding angle 9 is placed from below around the carrier strip 10 and therefore fixes the motorcycle storage case on the carrier strip 10. When the locking bolt 13 of the lock 12 is now turned into the groove 11 in the carrying handle 8, the motorcycle storage case is secured on the vehicle and cannot be removed by unauthorized persons. Together with the carrying handle 8, the locking handle 7 is at the same time also fixed by means of the locking bolt 13.

In order to be able to use an identical constructional unit 3 for the carrying and operating elements on a motorcycle storage case which can be mounted on the left as well as on the right side of the motorcycle, this constructional unit 3 is constructed to be symmetrical with respect to its transverse center plane 17.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A motorcycle storage case comprising:
   a basic housing,
   a lid covering an access opening of the basic housing, and
   a constructional unit fastened to the basic housing, said constructional unit including:
   a carrying handle,
   and a movable holding angle engageable with a vehicle frame member,
   wherein said carrying handle is mechanically coupled to the holding angle so that movement of said carrying handle to a storage position moves the holding angle to a case holding position.

2. A motorcycle storage case according to claim 1, wherein said constructional unit further includes a lid locking device for locking the lid in a closed position on the basic housing.

3. A motorcycle storage case according to claim 2, wherein said lid locking device includes a movable locking handle and at least one movable locking member coupled to the locking handle.

4. A motorcycle storage case according to claim 3, wherein said carrying handle and locking handle are mounted for pivotal movement about a common swivel axis.

5. A motorcycle carrying case according to claim 1, wherein outer contours of the constructional unit are symmetrical to a transverse center plane of the constructional unit.

6. A motorcycle carrying case according to claim 1, wherein the constructional unit is fastened to the basic housing by means of rivets.

7. A motorcycle carrying case according to claim 1, wherein the basic housing has a recess with a predetermined size and shape, and wherein said constructional unit is a standard size constructional unit which fits into said recess of the basic housing.

8. A motorcycle carrying case comprising:
   A basic housing, at least one angular suspension hook being provided on the bottom of the basic housing by means of which the case can be suspended on a carrier strip fastened to a motorcycle frame,
   a lid covering an access opening of the basic housing, and
   a constructional unit fastened to the basic housing, said constructional unit including:
   a carrying handle,
   and a housing fixing device for detachably fixing the
   basic housing to the vehicle frame, wherein the housing fixing device includes a holding angle which is swivelably held in the constructional unit for movement to a position fixing the basic housing on the carrier strip.

9. A motorcycle carrying case according to claim 8, wherein two of said angular suspension hooks are provided on the bottom of the basic housing,
   and wherein the holding angle is situated between the two angular suspension hooks on the bottom of the basic housing.

10. A motorcycle carrying case according to claim 8, wherein at least one profile is situated on a face of the basic housing, which profile positions the case together with a section fixed to a vehicle frame.

11. A motorcycle carrying case according to claim 10, wherein the carrier strip forms the section fixed to the vehicle frame.

12. A motorcycle carrying case according to claim 8, wherein the basic housing has a recess with a predetermined size and shape, and wherein said constructional unit is a standard size constructional unit which fits into said recess of the basic housing.

13. A vehicle storage case assembly for use with variously configured storage cases and vehicle frames, comprising:
- a basic housing having a predetermined standard sized recess, at least one suspension hook being provided on a bottom of the basic housing by means of which the case can be suspended on a carrier strip fastened to a vehicle frame,
- and a constructional unit disposable in the basic housing recess and fixedly fastenable to the basic housing, said constructional unit including:
  - a carrying handle,
  - and a housing fixing device for detachably fixing the basic housing to the vehicle frame, said housing fixing device including a holding member which is movably supported in the constructional unit for selective movement to a position fixing the basic housing on the carrier strip.

14. A vehicle storage case according to claim 13, comprising a lid covering an access opening of the basic housing,
said constructional unit further including a lid locking device for locking the lid in a closed position on the basic housing.

15. A vehicle storage case according to claim 13, wherein said carrying handle is mechanically coupled to the holding member so that movement of said carrying handle to a storage position moves the holding member to a case holding position.

16. A vehicle storage case according to claim 14, wherein said carrying handle is mechanically coupled to the holding member so that movement of said carrying handle to a storage position moves the holding member to a case holding position.

17. A vehicle storage case according to claim 14, wherein said lid locking device includes a movable lid locking member and at least one movable lid locking actuation member coupled to the lid locking member.

18. A vehicle storage case according to claim 13, wherein said carrying handle is mechanically coupled to the holding member so that movement of said carrying handle to a storage position moves the holding member to a position fixing the basic housing on the carrier strip.

19. A vehicle storage case according to claim 17, wherein said carrying handle is mechanically coupled to the holding member so that movement of said carrying handle to a storage position moves the holding member to a position fixing the basic housing on the carrier strip.

20. A vehicle storage case according to claim 19, wherein said carrying handle and the movable lid locking actuation member are pivotably carried at the constructional unit for pivotal movement about a common axis.

* * * * *